United States Patent [19]

Imsdahl

[11] Patent Number: 4,458,304
[45] Date of Patent: Jul. 3, 1984

[54] TROUBLE LIGHT STAND

[76] Inventor: Allan J. Imsdahl, 1604 Sherwood Ave., St. Paul, Minn. 55106

[21] Appl. No.: 461,677

[22] Filed: Jan. 27, 1983

[51] Int. Cl.³ .................................. F21V 21/00
[52] U.S. Cl. .................. 362/387; 362/253; 362/376; 362/396; 362/399; 362/400; 362/418; 362/427; 362/457
[58] Field of Search .............. 362/253, 376, 387, 396, 362/399, 400, 418, 427, 457

[56] References Cited

U.S. PATENT DOCUMENTS

| | | | |
|---|---|---|---|
| 2,778,931 | 1/1957 | Cruz | 362/396 |
| 3,244,873 | 4/1966 | Leutheuser | 362/376 |
| 3,809,883 | 5/1974 | Goodwin | 362/376 |
| 4,369,487 | 1/1983 | Carlow | 362/396 |

Primary Examiner—Stephen J. Lechert, Jr.
Attorney, Agent, or Firm—Williamson, Bains, Moore & Hansen

[57] ABSTRACT

A trouble light support and storage device has a flat frame with an aperture therein for receiving and encompassing a trouble light and permitting forward or rearward directing of the light's beam. The frame includes upper and lower transverse flexing web members between which a trouble light is extended with the web members being elastically flexed to firmly retain the trouble light and prevent destructive rattling and shaking thereof. The frame includes primary and secondary cord storage reels.

9 Claims, 4 Drawing Figures

U.S. Patent  Jul. 3, 1984  4,458,304
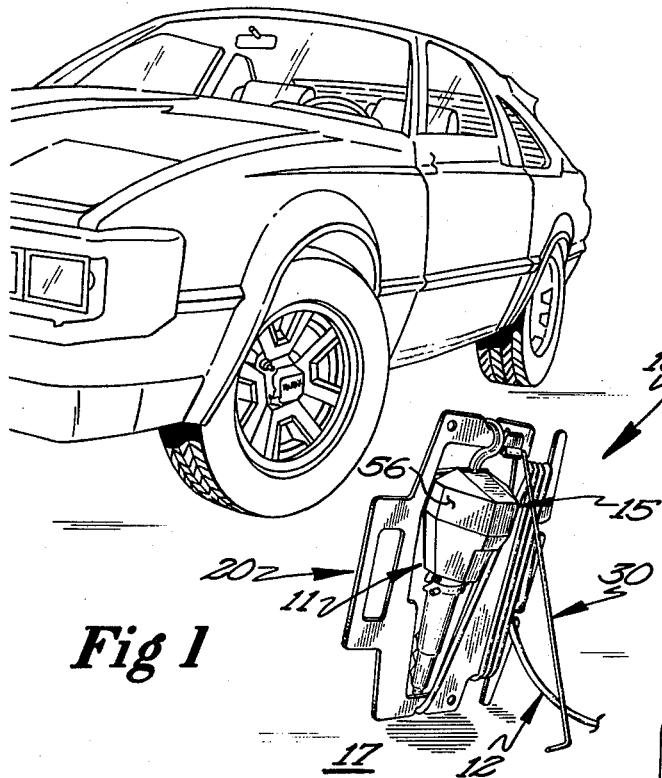
Fig 1
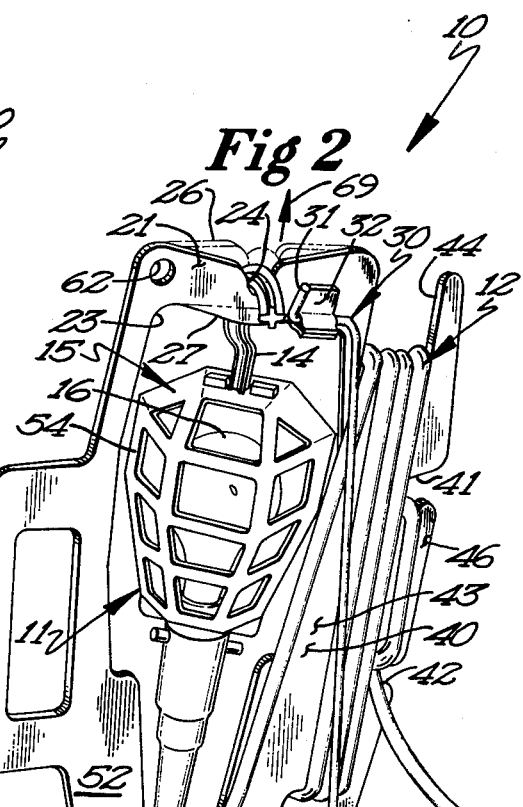
Fig 2
Fig 3
Fig 4

TROUBLE LIGHT STAND

BACKGROUND OF THE INVENTION

The invention relates to the field of trouble light systems and provides a new support and storage device for retaining a conventional portable trouble light and its electrical cord.

The conventional, well known trouble light is useful in many applications ranging from the repair of automobiles and motor vehicles to general repair work in darkened environments and auxiliary utility lighting purposes. In most applications requiring a trouble light, it is desirable to have some means of retaining or supporting the trouble light to permit its light to be directed at the work area, yet requiring little or no hand support from an operator. Often the type of work associated with the need for a trouble light will subject the trouble light to situations in which the bulb is easily damaged or broken, and accordingly it is desirable to not only provide an improved device for retention and support of the trouble light but also to provide additional protection to the trouble light so as to avoid breakage or failure.

While most commercially available trouble lights are operated on 110 volt AC power, the use of 12 volt DC trouble lights for operation off a motor vehicle battery is becoming increasingly common. With the constant risk of emergency situations during nighttime highway travel, it is highly desirable to carry a reliable portable trouble light and means to store and protect it. A working trouble light can warn after-dark traffic that there is an accident or obstruction on the road and help reduce the number of injuries to motorists repairing their vehicles on roads and highways. The portable trouble light, operable on 12 volt power or standard house current, can serve as a light source for the motorist repairing his vehicle and eliminate the need for often unreliable flashlights.

In recent years the commercially available trouble light has enjoyed greatly increased popularity and its retail price has dropped dramatically with mass production and inexpensive plastic components. With the adoption of plastic materials, however, the trouble light has become more vulnerable than when manufactured of heavier, longer lasting materials, and consequently a trouble light stand which protects and retains the trouble light during periods of both use and storage can significantly increase the use life of such an appliance.

While portable trouble lights are well known to the art, few storage or protection devices for such trouble lights have been utilized or widely accepted. While there are portable trouble lights which utilize an integral stand having a built-in light or lantern system, only Mainzer U.S. Pat. No. 3,014,123 discloses a flat trouble light stand which can be erected in a self supporting condition adapted to rest upon a surface. The known trouble light devices, including the Meinzer device, have generally been too bulky for convenient use or have no provision for retaining a conventional trouble light.

With the above problems in mind, it is desirable to provide an improved support and storage device for a portable trouble light which retains a conventional trouble light within a protective frame to thereby inhibit destructive rattling and shaking of the trouble light while still directing the light in a predetermined orientation suitable to the type of work being performed.

It has also been found desirable to provide a trouble light storage and support device which retains the electrical cord of the light in an orderly, protective manner so as to avoid cord damage during transportation and storage and to further enhance worker safety during operation when long and twisted cords pose a danger to those walking nearby.

It has also been found desirble to provide a trouble light storage and support device which will direct the light beam in an upward or downward direction depending upon the needs of the operator, and to provide a device which is compact, easily and economically manufactured and which preferably folds to a flat configuration for easy storage.

The present invention is directed toward solving these problems and provides a workable and economical solution to them.

SUMMARY OF THE INVENTION

A portable trouble light storage and support device allows a trouble light to be retained in a substantially upright position and includes a generally flat frame having an aperture formed therein for receiving the trouble light and also having flexible transverse web members which flex to retain the trouble light under tension in the aperture so as to reduce destructive rattling and shaking of the light.

The flexible web members of the frame are dislaceable between rest and flexed positions, and such flexing occurs when the mounting hook of the trouble light is engaged in a groove on the first web member and the electrical cord of the trouble light is tensionably retained within a cord retaining means located adjacent the second web member.

The invention also utilizes a bail which is swingably mounted to the framework and is movable between a rest position wherein the lower end of the bail is closely confined against the second web member by means of the electrical cord overlying the bail thereby reducing pivoting of the bail, and a use position, wherein the lower end of the bail is extended outwardly from the frame and contacts a working surface thereby supporting the trouble light in a substantially upright position.

The frame includes a third web member, perpendicular to and adjacent to the first and second transverse web members, having a pair of recessed grooves and a pair of recessed slots. The third web member defines a primary and secondary cord storage reel with the primary storage reel including a pair of recessed slots with one of the slots adjacent the first web member and the remaining slot adjacent the second web member. These slots receive and retain most of the trouble light electrical cord. The secondary cord storage reel includes a pair of recessed grooves so that the electrical cord adjacent the electrical cord plug is retained thereby and the plug is retained during transportation.

The invention is structured to permit the selective direction of the light beam in an upward or downward direction so that light may be aimed at the working area. This directional control is achieved by reversing the trouble light in the frame aperture and permits the operator to focus the light beam where needed without the need to hold the trouble light.

Other objects and advantages of the invention will become apparent from the following detailed description and from the appended drawings in which like numbers have been used to describe like parts of the several views.

DESCRIPTION OF THE DRAWINGS

FIG. 1 is a rear perspective view of an embodiment of the trouble light storage and support device in use.

FIG. 2 is an enlarged view of the trouble light storage and support device of FIG. 1 with the trouble light reversed in the frame aperture illustrating the flexing of the transverse web members of the frame.

FIG. 3 is a rear perspective view of the trouble light storage and support device in its rest position.

FIG. 4 is a front elevation view of the trouble light frame.

DESCRIPTION OF THE PREFERRED EMBODIMENT

Referring now to FIG. 1, a trouble light storage and operating device 10 retains a trouble light 11 in an upright position relative to a working surface 17. The trouble light 11 includes an electrical cord 12 and an electrical cord plug 13, the plug 13 being suitable for 110 volt use. The device 10 may also be adapted for 12 volt battery use. The trouble light also includes a bulb 16 which is protected from external forces by a protective housing 15 which encompasses the bulb 16. The protective housing 15 is preferably injection molded and made of a plastic or plastic-like material. The trouble light assembly 11 also includes a mounting hook 14 which is attached to the top portion of the protective housing and is also preferably made of a plastic or plastic-like material which is substantially elastically deformable.

The device 10 utilizes a generally flat frame 20 which may be injection-molded and formed of a plastic or plastic-like material thereby permitting elastic displacement of specific frame portions when external forces are applied to the frame portions. An aperture 23 is provided within frame 20 to permit the trouble light 11 to be mounted within the frame 20 so as to protect the trouble light 11 from external impact or damage.

The frame 20 includes two transverse web members 21 and 22 located along its upper and lower edges, respectively. The first web member 21 includes a groove 24 for engaging the mounting hook 14 of the trouble light 11 and provides a means for preventing lateral slippage of the mounting hook 14 in direction 66 or 68. The second web member 22 includes a notch 25 for engaging and retaining the trouble light electrical cord 12 in a controlled position and provides a cord retaining means. When the mounting hook 14 is engaged with the groove 24 and the cord 12 is positioned through notch 25, the trouble light 11 is reliably retained within the frame aperture 23 and vibration and slippage of the trouble light 11 in the frame aperture 23 are greatly reduced and light can be aimed in a predetermined direction.

As best shown in FIG. 2, a first web member 21 is displaceable between an unstressed rest position 26 shown in phantom, and a flexed position 27. In the flexed position 27, the first web member 21 is elastically flexed toward the second transverse web member 22 as a result of mounting hook 14 being engaged with groove 24 and the cord 12 being retained in the notch 25. The flexing of the first web member 21 generates a restoring force 69 and accordingly the flexing first member 21 cooperates with the second member 22 to securely retain the trouble light therebetween and reduce vibration and slippage of the trouble light 11. By significantly reducing vibration and slippage of the trouble light 11 in the frame 20, a continuous, steady beam of light may be directed to the working area and risk of damage to the light is avoided.

Similar to the first web member 21, the second web member 22 is also displacable between the rear position 28, shown in phantom, and a flexed position 29. In the rest position 28, the second web member 22 is unstressed but in the flexed position 29, the second web member 22 is elastically flexed toward the first web member 21 as a result of mounting hook 14 being engaged with the groove 24 and the cord 12 being tensioned through the notch 25. The flexing of the second web member 22 also generates a restoring force 70 directed from the first web member 21 toward the second web member 22, the upward force exerted on the second web member 22 by the electrical cord 12 being passed through notch 25 and the restoring force generated by the flexed web members 21 and 22 cooperating to reduce vibration and slippage of the trouble light.

The flexed positions 27 and 29 of the first and second web members 21 and 22, respectively, are somewhat exaggerated in FIG. 2 to better illustrate the deformation of such web members. In the preferred embodiment, the groove 24 also provides a means for engaging the mounting hook 14 to prevent lateral slippage of the mounting hook 14 in directions 66 or 68.

The mounting hook 14 is preferably made of a plastic or plastic-like material so as to permit the hook 14 to elastically flex and allow the hook 14 to cooperate with the groove 24 to generate a restoring force directed from the second web member 22 toward the first web member 21 in order to better retain the mounting hook 14 within the groove 24 thereby reducing rattling and shaking of the trouble light 11.

Referring now to FIG. 3, the embodiment 10 also includes a bail 30 having an upper end 31 and a lower end 33. The upper end 31 of the bail 30 is swingably mounted to the frame 20 by means of a bail mounting clip 32 and the lower end 33 of the bail 30 has a foot 34 which provides improved stability on a working surface 17. The bail 30 is swingably movable between a rest position 35 and a use position 37. In the rest position 35, the lower end 33 of the bail 30 is closely confined adjacent the second web member 22 by means of the cord 12 overlying the bail 30 at position 36. The close confinement of the bail 30 in its rest position 35 retains the bail 30 in rest position during transport. In the bail use position 37, the bail 30 is extended outwardly from the frame 20 so that the projecting foot 34 of the bail 30 contacts the working surface 17 to support the frame 20 in a substantially upright position. The bail 30 can be returned to its rest position by manually positioning the lower end 33 of the bail underneath the electrical cord 12 at position 36.

The device 10 is reversible to permit a continuous beam of light to be aimed upwardly or downwardly at a working area. While front face 50 is directed at the vehicle in FIG. 1, it should be understood that the rear face 52 upon which the bail 30 is mounted may, instead, confront the vehicle. In such an arrangement, the light emitting apertures of light housing 15 will be positioned to face the vehicle but due to the angle of the frame 20, light will be directed downwardly. As shown in FIG. 2, a continuous beam of light is directed downwardly relative to the frame 20 when the light is so positioned. The downwardly directed light allows the operator to effectively light a lower work area. As illustrated in FIG. 1, a continuous beam of light is directed upwardly relative to the frame 20 when the light emitting face 54 of the light is positioned relative to the front face 50 of the frame. By inclining the bail 30 to various angular relationships to the frame, the operator can aim the beam of light to his desired working area.

The frame 20 also includes a third web member 40 which is adjacent to and perpendicular to the web members 21 and 22. The third web member 40 defines a primary and a secondary cord storage reel 43 and 46, respectively, in which the primary cord storage reel 43 includes a pair of recessed slots 44 and 45 with slot 44 being adjacent the first web member 21 and the slot 45 adjacent the second web member 22. The secondary cord storage reel 46 includes a pair of recessed grooves 41 and 42. The primary and secondary cord storage reels 43 and 46, respectively, provide a means by which the electrical cord 12 can be wound and stored easily and the plug 13 can be retained during transportation. The primary cord storage reel 43 comprises slots 44 and 45 and the portion of third web member 40 therebetween.

The secondary cord storage reel 46 retains the cord segment 47 nearest the electrical plug 13. The cord segment 47 adjacent the electrical cord plug 13 is wound between grooves 41 and 42 with the plug 13 extending outwardly from either groove 41 or 42. The secondary cord storage reel 46 includes the grooves 41 and 42 and the portion of web member 40 therebetween. The secondary cord storage reel 46 provides a means for retaining short lengths of cord which would not be readily windable into the primary reel thereby providing a more orderly storage of the cord during storage and use.

The frame 20 also includes a handle 60 for convenience of operator handling. Holes 62 and 64 permit the frame 20 to be hung on a hook or nail.

In operation, the user may carry the frame 20 to the desired location by means of the handle 60. The trouble light 11 is mounted within the frame aperture 23 by nesting the mounting hook 14 within the groove 24 and the electrical cord 12 through the notch 25. The bail 30 is swung outward relative to frame 20 so that the foot 34 contacts the working surface 17 thereby supporting the frame and aiming the light in the desired direction. The cord segment 47 nearest the plug 13 is initially unwound from between grooves 41 and 42 of secondary cord storage reel 46 and the cord 12 between slots 44 and 45 of primary reel 46 is unwound to the extent necessary to connect the plug 13 to a power source.

When the hook 14 is engaged with groove 24 and cord 13 is tensioned through notch 25, the first and second web members 21 and 22, respectively, of the frame 20 flex. The The first web member 21 elastically flexes from rest position 26 to flexed position 27. This flexing of the first web member 21 generates a restoring force 69 directed as shown in FIG. 2.

The second web member 22 elastically flexes between rest position 28 and flexed position 29, thereby generating a restoring force 70 directed from the first web member 21 toward the second web member 22. The upper and lower web members thus cooperate with one another to apply forces 69 and 70 to the trouble light and thereby reliably retain the trouble light 11 within the frame aperture 23 and prevent rattling and shaking thereof.

The trouble light 11 may also be reversed within the frame aperture 23 to permit the selective direction of the light beam in an upward or downward direction at the desired working area. The trouble light 11 may be rotated within the frame aperture 23 by simply stretching the plastic or plastic-like material of the mounting hook 14 to thereby release the hook from the groove 24 and reposition it in the groove. Some lights have the hook rotatable relative to the housing 15 to further simplify rotation. The upward and downward directionality of the light is further controlled to some degree by the angle between bail 30 and frame 20. Light may be aimed in a downwardly direction by engaging the mounting hook 14 in the groove 24 such that light emitting surface 54 and rear face 52 confront the work area. The light 11 may be reversed and the light beam aimed in an upwardly direction by having front face 50 and the light emitting surface 54 of the housing simultaneously confront the work area.

When the trouble light is no longer in use, its electrical cord 12 and the bail 30 can be stored compactly adjacent the frame 20. Unwanted knotting and tangling of the cord are alleviated by the third web member 40 with its primary and secondary cord storage reels 43 and 46, respectively. To store the electrical cord 12, the operator passes the cord 12 nearest the trouble light 11 through the notch 25 and continues to extend the cord 12 adjacent the rear face 54 of the frame 20. The cord is extended upwardly along the rear face 54 of the frame 20 until it reaches slot 44 at which point most of the cord 12 is continuously wound between slots 44 and 45. The cord segment 47 nearest the electrical cord plug 13 is wound between grooves 41 and 42 with the cord plug 13 extending outwardly either from groove 41 or 42. The cord 12 is further retained closely adjacent the rear face 54 of the frame 20 by the bail 30 being manually positioned so that the bail 30 overlies the cord 12 at position 38 and the foot 34 of the bail 30 is manually positioned beneath the cord 12 adjacent the rear face 54 upwardly of the notch 25. The bail 30 is stored in rest position 35 by manually pivoting the foot 34 of the bail 30 underneath the cord 12 adjacent the rear face 54. In these stored positions, the user can easily transport and store the device 10 or hang it on a wall hook using holes 62 or 64.

While the preferred embodiments of the present invention have been described, it should be understood that various changes, adaptations and modifications may be made therein without parting from the spirit of the invention and the scope of the appended claims.

What is claimed is:

1. A trouble light support and storage device capable of retaining a trouble light having an electrical cord, an electrical cord plug and a mounting hook for holding a trouble light in an upright position relative to a working surface comprising:

a frame of substantially elastically flexible material and including first and second transverse web members and a third web member being perpendicular and adjacent to said first and second transverse web members and having a pair of recessed grooves, said frame also including a trouble light receiving aperture formed in said frame, said trouble light receiving aperture capable of receiving the trouble light and encompassing the trouble light to protect it from damage;

said first web member including means for preventing lateral slippage of the mounting hook relative to said first web member;

said second web member including trouble light cord retaining means for retaining the cord in a predetermined position relative to said second web member;

said means for preventing lateral slippage and said cord retaining means cooperating to tensionally retain the trouble light in said aperture within said frame when the hook is engaged with said means for preventing lateral slippage and the cord is engaged by said cord retaining means, so that light is directed in a predetermined direction and vibration and slippage of the trouble light are inhibited;

said third web member including primary and secondary cord storage reels;

said primary storage reel including a pair of recessed slots with one of said slots being adjacent said first web member and the remaining slot adjacent said second web member to receive and retain the electrical cord in said slots; and said secondary cord reel including said pair of recessed grooves so that the cord adjacent the electrical cord plug is retained by said secondary cord reel with the electrical plug positioned through said recessed grooves to retain the cord plug during transportation and permit easy winding.

2. The trouble light support and storage device of claim 1 wherein:

said first web member of said frame is displacable between a rest position, wherein said first web member is unstressed, and a flexed position, wherein said first web member is elastically displaced toward said second web member when the hook is engaged with said means for preventing lateral slippage and the cord is tightly retained on said cord retaining means so as to generate a restoring force directed from said second member toward said first member and to thereby cooperate with said second web member to inhibit rattling and shaking of the trouble light.

3. The trouble light support and storage device of claim 1 wherein:

said second web member of said frame is displacable between a rest position, wherein said second web member is unstressed, and a flexed position, wherein said second web member is elastically displaced toward said first web member when the hook is engaged with said means for preventing lateral slippage and the cord is tightly retained on said cord retaining means so as to generate a restoring force directed from said first member toward said second member and to thereby cooperate with said first web member to inhibit rattling and shaking of the trouble light.

4. The trouble light support and storage device of claim 1 and further including:

a bail having upper and lower ends with said upper end mounted to said frame, said bail being swingably movable between a rest position, wherein said lower end is closely confined to said second web member by means of the cord overlying said bail, thereby inhibiting said bail from pivoting, and a use position, wherein said lower end is extended outwardly from said frame and contacts the working surface and cooperates with said frame to support the trouble light in a substantially upright position.

5. A trouble light support and storage device comprising:

a trouble light having a mounting hook, an electrical cord, an electrical cord plug, a protective housing, and a bulb;

a frame of substantially elastically flexing material and including first and second transverse web members, and also including a trouble light receiving aperture formed in said frame, said trouble light receiving aperture receiving said trouble light and encompassing said trouble light to protect it from damage;

said first web member including means for engaging said mounting hook to prevent lateral slippage of said mounting hook relative to said first web member;

said second web member including trouble light cord retaining means engaging said cord to retain said cord in a predetermined position relative to said second web member; and said means for engaging said mounting hook and said cord retaining means cooperating to tensionally retain said trouble light in said aperture within said frame when said hook is engaged with said means for engaging said mounting hook and said cord is engaged by said cord retaining means so that light is directed in a predetermined direction and vibration and slippage of said trouble light are inhibited.

6. The trouble light support and storage device of claim 7 wherein:

said mounting hook is made of a substantially elastically flexing material so as to generate a restoring force directed from said second member toward said first member and to thereby cooperate with said means for engaging said mounting hook so that rattling and shaking of said trouble light are inhibited.

7. The trouble light support and storage device of claim 6 and further including:

a bail having upper and lower ends with said upper end fixed to said frame and said lower end extending outwardly from said frame and contacting the working surface and cooperating with said frame to support said trouble light in a substantially upright position;

said light is rotatably mounted in said aperture to direct light in a forwardly or rearwardly direction relative to said frame.

8. A trouble light support and storage device capable of retaining a trouble light having an electrical cord, an electrical cord plug and a mounting hook and for holding a trouble light in an upright position relative to a working surface comprising:

a frame of substantially elastically flexing material and including first and second transverse web members and also including a trouble light receiving aperture formed in said frame, said trouble light receiving aperture capable of receiving the trouble light and encompassing the trouble light to protect it from damage;

said first web member including means for preventing lateral slippage of the mounting hook relative to said first web member;

said second web member including trouble light cord retaining means for retaining the cord in a predetermined position relative to said second web member;

said means for preventing lateral slippage and said cord retaining means cooperating to tensionally retain the trouble light in said aperture within said frame when the hook is engaged with said means for preventing lateral slippage and the cord is engaged by said cord retaining means; and said first web member of said frame being movable between a rest position, wherein said first web member is unstressed, and a flexed position, wherein said first web member is elastically displaced toward said second web member when the hook is engaged with said means for preventing lateral slippage and the cord is tightly retained on said cord retaining means so as to generate a restoring force directed from said second member toward said first member and to thereby cooperate with said second web member to inhibit rattling and shaking of the trouble light.

9. The trouble light support and storage device of claim 8 wherein:

said second web member is movable between a rest position, wherein said second web member is unstressed, and a flexed position wherein said second web member is elastically displaced toward said first web member when the hook is engaged with said means for preventing lateral slippage and the cord is tightly retained on said cord retaining means so as to generate a restoring force directed from said first member toward said second member and to thereby cooperate with said first web member to inhibit rattling and shaking of the trouble light.

* * * * *